United States Patent
Voyer et al.

(10) Patent No.: US 6,434,111 B1
(45) Date of Patent: Aug. 13, 2002

(54) SOFT DECISION RULE FOR DEMODULATION OF BI-ORTHOGONAL SIGNALS

(75) Inventors: Nicolas Voyer, Rennes (FR); Hideshi Murai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/264,877

(22) Filed: Mar. 9, 1999

(30) Foreign Application Priority Data

Mar. 13, 1998 (FR) .............................. 98 03389

(51) Int. Cl.⁷ .............................................. H04J 11/00
(52) U.S. Cl. ...................................... 370/203; 375/340
(58) Field of Search ................................. 370/203, 204, 370/208, 209, 320, 335, 342, 441; 375/340, 341, 262; 714/794, 795

(56) References Cited

U.S. PATENT DOCUMENTS 5,442,627 A   8/1995   Viterbi et al.
5,475,710 A  * 12/1995  Ishizu et al. ................. 375/232
6,289,000 B1 *  9/2001  Younge, III ................ 370/203

FOREIGN PATENT DOCUMENTS

WO   WO 95/22859 A1   8/1995

\* cited by examiner

*Primary Examiner*—Douglas Olms
*Assistant Examiner*—Ken Vanderpuye
(74) *Attorney, Agent, or Firm*—Rothwell, Figg, Ernst & Manbeck

(57) ABSTRACT

The invention relates to a process for the demodulation of signals representative of sequences ($SE_1$ to $SE_N$) transmitted in a communications system, which includes determining a correlation value ($a_1$ to $a_n$), deducting from the correlation values ($a_1$ to $a_n$) a confidence value ($w_1$ to $w_N$), and deducting from the confidence values ($w_1$ to $w_N$) soft decision values ($C_1$ to $C_k$) to be used for each element of the demodulated symbol.

4 Claims, 1 Drawing Sheet

SOFT DECISION RULE FOR DEMODULATION OF BI-ORTHOGONAL SIGNALS

BACKGROUND OF THE INVENTION

The invention relates to a process for the demodulation of signals indicative of sequences emitted in a communications system, such as, for example, a system of spread band communications making use of orthogonal or bi-orthogonal modulation. Such a communications system is, for example, a multiple access communications system, such as a wireless telephone system or a communications system of the satellite repeater type. For example, the present invention may apply to a communications system which uses the CDMA system (Code Division Multiple Access).

A spread band communications system to which the process according to the invention may apply is known, and is, for example, of the type which is described in U.S. Pat. No. 5,602,833. As shown in FIG. 1, such a system is essentially constituted, on the transmission side, by an encoder 10, a modulator 20, and a transmitter unit 30 transmitting on a channel 40. On the reception side, it is constituted by a receiver unit 50, a demodulator 60, corresponding to the modulator 20, and a decoder 70 which corresponds to the encoder 10. In general, such systems likewise comprise an interleaver 15, which is located between the encoder 10 and the modulator 20, as well as a de-interleaver 65, corresponding to the interleaver 15, and located between the demodulator 60 and the decoder 70.

The encoder 10 and the interleaver 15 are known in the art, and are provided in order to encode, with repetition and interleaving, an incoming bit stream representing speech signals, data signals, or other signals, for example, first amplified, filtered, and digitized. This encoding is of the type which allows the implementation of error detection and correction functions. In association with an interleaving processing system, this encoding also allows the system to operate with low noise-to-signal ratio and low interference signal ratio. The signals resulting from the encoding and interleaving processes are a sequence of k-area words or symbols consisting of k elements generally referred to as 1 and −1 (or 0 and 1).

This sequence of symbols is subjected, in the modulator 20, to a modulation process referred to as orthogonal modulation or bi-orthogonal modulation.

In the case of orthogonal modulation, the modulator 20 comprises a generator 21 of orthogonal words. Such words are also referred to sequences or functions. In the remainder of the description, they are referred to by the term "functions".

These functions may be Walsh functions, which are derived on the basis of Walsh matrices, known by the name of Hadamard matrices. It is reminded that Hadamard matrices are matrices which are derived in a recursive manner, such that a matrix of functions of the order n can be written:

$$W(n) = \begin{vmatrix} W(n)/2 & W(n/2) \\ W(n/2) & \overline{W(n/2)} \end{vmatrix}$$

where $\overline{W}$ represents the logical complement of the matrix W. In addition, the matrix W(1) of dimension 1, is equal to 1.

Each column or line of a matrix W(n) of the order n is called a Walsh function, and is annotated $S_p(n)$, where p is the number of the column or line of the function under consideration, and n is the dimension of the function. It will be more simply also annotated as $S_p$.

For example, the Walsh matrix of the dimension 8 is written as follows:

$$W(8) = \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix}$$

Also by way of example, the sequence $S_4$ is written $\{1,-1,-1,1,1,-1,-1,1\}$.

It will be noted that the elements 1 and −1 have been used, but the elements 0 and 1 respectively could also be used.

Digital modulation consists of assigning to each possible symbol p deriving from the interleaving device 15 a sequence to be transmitted $SE_p$. In the case of orthogonal modulation, the assigned sequences $SE_p$ correspond to the Walsh functions $S_p(n)$. Accordingly, the symbols of three bits can be modulated by way of the Walsh functions of dimension 8, and, in general terms, symbols of k bits will be modulated by way of N ($=2^k$) sequences $SE_p$ of dimension n ($=2^k$).

For example, for two-bit incoming symbols, a list is given in Table 1 below of the corresponding $SE_p$ sequences transmitted and attributed by the modulator 20.

TABLE I

| Incoming symbol | Sequence attributed |
| --- | --- |
| 1  1 | $SE_1 = S_1(4) = \{1,1,1,1\}$ |
| −1  1 | $SE_2 = S_2(4) = \{1,-1,1,-1\}$ |
| 1 −1 | $SE_3 = S_3(4) = \{1,1,-1,-1\}$ |
| −1 −1 | $SE_4 = S_4(4) = \{1,-1,-1,1\}$ |

Bi-orthogonal modulation consists of attributing to an incoming symbols p a corresponding sequence, $SE_p$, either an orthogonal function, such as, for example, a Walsh function $S_q$ of dimension $n=2^{k-1}$, when the last element ($k^{th}$ element) is in an first state, or a logic complement of this function $S_q$, of the same dimension n, when the last element ($k^{th}$ element) is in a second state. In general terms, the k bits symbols are modulated by means of N ($=2^k$) sequences $SE_p$, of length n ($=2^{k-1}$). Bi-orthogonal modulation is described, for example, in the European Patent document EP-A-809 364.

For example, for the two-bit incoming symbols, the list of the corresponding sequences attributed by the modulator 20 is shown in Table II below

TABLE II

| Incoming symbol | Sequence attributed |
| --- | --- |
| 1  1 | $SE_1 = S_1(2) = \{1,1\}$ |
| −1  1 | $SE_2 = S_2(2) = \{1,-1\}$ |
| 1 −1 | $SE_3 = -S_1(2) = \{-1,-1\}$ |
| −1 −1 | $SE_4 = -S_2(2) = \{-1,1\}$ |

The sequences $SE_p$ attributed during orthogonal or bi-orthogonal modulation are then processed and transmitted by the transmitter unit 30. They are transmitted, via the channel 40, to the receiver unit 50 and to the demodulator 60, which are respectively the corresponding of the transmitter unit 30 and the modulator 20.

The demodulation process which is implemented in the demodulator 60 consists accordingly in recovering, in the signal transmitted by the receiver unit 50, the sequence $SE_p$, used during the modulation, and then in recovering, on the basis of this sequence, the modulated symbol p.

Several processes could be carried out.

The first consists of selecting the sequence the correlation value between the signal transmitted by the receiver unit 50 and the corresponding function of which is the strongest. It accordingly consists of selecting the sequence $SE_p$ the probability of which that it has been transmitted is the greatest. The sequence $SE_p$ having been selected, the symbol p associated with this sequence is then recovered and supplied to the de-interleaver 65 and then to the decoder 70.

The decoder 70 is, for example, a decoder of the maximum probability type, for example such the one described by A. J. Viterbi in an article appearing in the IEEE Transactions on Communications Technology of October 1971, entitled "Convolutional codes and their performance in communication systems".

This method is referred to in the technical domain as the Hard Decision Method.

Another method, referred to as the Soft Decision Method, consists of determining, on the basis of the correlation values obtained by a correlation process between the signal transmitted by the receiver unit 50 and each of the functions that could be used during the modulation process, a confidence value for each sequence $SE_1$ to $SE_N$ associated with each of the said functions. It also consists in deducing from this group of confidence values a soft decision value to be attributed to each element of the demodulated symbol p. The demodulated symbol accordingly formed from each of these decision values is then, as before, supplied to the de-interleaver 65 and then to the decoder 70.

It can be pointed out that the theoretical formulation of this group of soft decision values taken in accordance with the criterion of maximum probability is provided in a general manner by the following formula:

$$L(\hat{u}_k) = \ln \frac{\sum_{\forall x\_for\_which\_u_i=+1} P(SE_x|y)}{\sum_{\forall x\_for\_which\_u_i=-1} P(SE_x|y)}$$

where $P(x|y)$ represents the probability, in the awareness that the signal has been received, of deciding that the sequence $SE_x$ has been issued, and $u_i$ is the element of the order i of the symbol x corresponding to the sequence $SE_x$ under consideration.

A demodulation process applied following this formulation would have the drawback of requiring, for its calculation, a great number of relatively long mathematical operations to be carried out. Furthermore, it can be shown that the optimum soft decision values require a prior knowledge of the statistical behaviour of the transmission channel, for example the signal-to-noise ratio, or the statistical behaviour of this ratio (Gauss' Law, Rice's Law, Rayleigh's Law, etc.).

U.S. Pat. No. 5,442,627 describes a demodulator the purpose of which is to resolve these problems. Such a demodulator is represented in FIG. 2.

It essentially consists of correlation means 61, which receive the signals issued from the receiver unit 50, which are in the form of data samples. These correlation means 61 consist, for example, of means for calculating a Fast Hadamard Transform or F.H.T., or of means for calculating correlation. These means provide, for each Walsh function $S_1$ to $S_N$ that could be used during the modulation process, a correlation value $\alpha_1$ to $\alpha_n$ indicative of the correlation with the current signal.

These means 61 are followed by means 62, which allow for the determination of a confidence value which corresponds to the energy portion $w_1$ to $w_N$ of the received signal associated with each sequence $SE_1$ to $SE_N$ that could have been transmitted. For each sequence of $SE_p$ equal to a function $S_p$, the energy portion $w_p$ associated with the said sequence is generally calculated in means 62 as being the square of the correlation value $\alpha_p$ with the said function ($w_p = \alpha_p^2$).

The demodulator then consists of metric calculation means 63 which determine, on the basis of all the values $w_1$ to $w_N$ provided by the correlation means 62, all Soft Decision Values $C_1$ to $C_k$, and attribute them respectively to the elements $u_1$ to $u_k$ of the demodulated symbol.

Accordingly, each Soft Decision value is provided according to the following formula:

$$C_i = \max_{p\_for\_which\_u_i=+1}(w_p) - \max_{p'\_for\_which\_u_i=-1}(w_{p'})$$

where the first max function corresponds to the highest of the energy portions $w_p$ of the $SE_p$ sequences for which the corresponding demodulated symbols p have the element $u_i$ equal to +1 and the second max function corresponds to the highest of the energy portions $w_{p'}$, of the sequences $SE_{p'}$, for which the corresponding demodulated symbols p' have the element $u_i$ equal to −1.

One of the disadvantages of such a method results from the fact that it cannot be directly applied to bi-orthogonal modulation. In fact, in the case of bi-orthogonal modulation, means 61 (F.H.T. Fast Hadamard Transform, or means for calculating the correlation between the signal present at the output of the receiver unit 50 and each Walsh sequence) cannot be applied as such.

The aim of the present invention is therefore to provide a demodulation process of which the complexity of implementation is, in relative terms, as low as that one just described and which could, on one hand, take consideration of all the elements of the demodulated symbols, and, on the other, equally well be applied to orthogonal modulation as well as bi-orthogonal modulation.

SUMMARY OF THE INVENTION

To achieve this aim, a demodulation process according to the invention is characterised in that it consists of:

Determining a correlation value between each orthogonal value which could have been used during the modulation process and the signals to be demodulated;

To deduct from the said correlation values a confidence value attributed to each sequence that could have been transmitted, the said confidence value being calculated in the following manner:

If the symbol associated with the said sequence has its last element in a first state, the said value is either equal to the square of the correlation value between the signal which is to be demodulated and the function used for the said sequence if the said correlation value is positive, or zero if the said correlation value is negative;

If the symbol associated with the said sequence has its last element in a second state, the said value is either zero if the said correlation value is positive, or equal to the square of the correlation value between the signal deriving from the said receiver unit and the said sequence if the said correlation value is positive;

Deducting from the said confidence values the said soft decision values to be attributed to each element of the demodulated symbol.

In addition to this feature, provision is made for a process such that the determination of the soft decision values allow, by contrast with the process described earlier, for taking consideration of the confidence values of all the elements of the demodulated symbol. So, according to another characteristic of the invention, the decision value to be attributed to an element of the demodulated symbol is calculated as being equal to the sum of all the confidence values attributed to the sequences associated with the symbols of which the said element is equal to a first value from which is taken off the sum of all the confidence values associated with the sequences corresponding to the symbols of which the said element is equal to a second value.

The characteristics of the invention described above, as well as others, will become more apparent when the following description is read relating to an embodiment, the said description being related to the appended drawings, which show:

DETAILED DESCRIPTION OF THE PREFERRED EMBODIMENT

Figure 1:
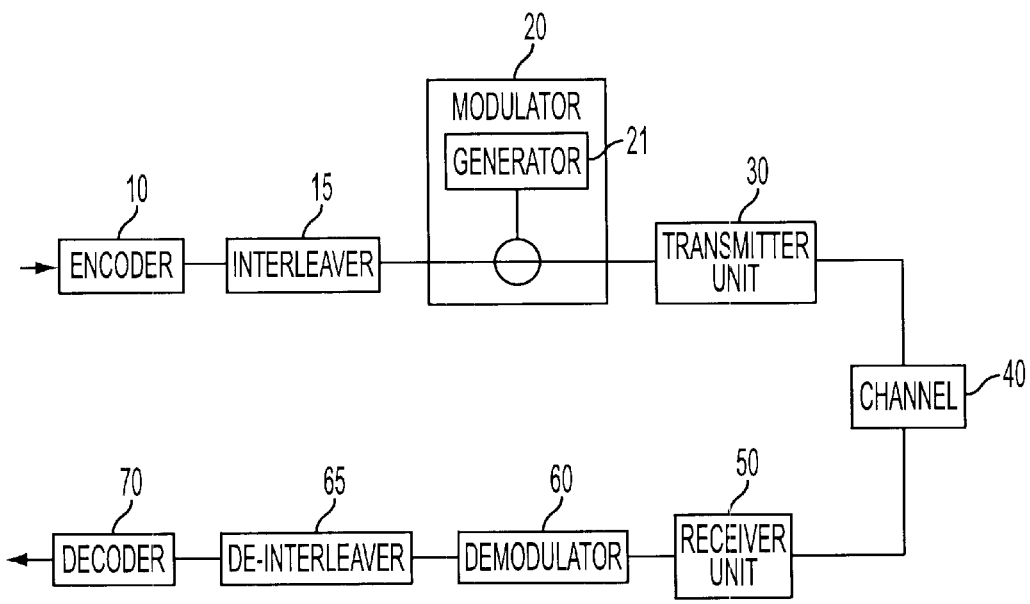
FIG. 1: A synoptic diagram of a communications system to which the present invention is applied.
Figure 2:
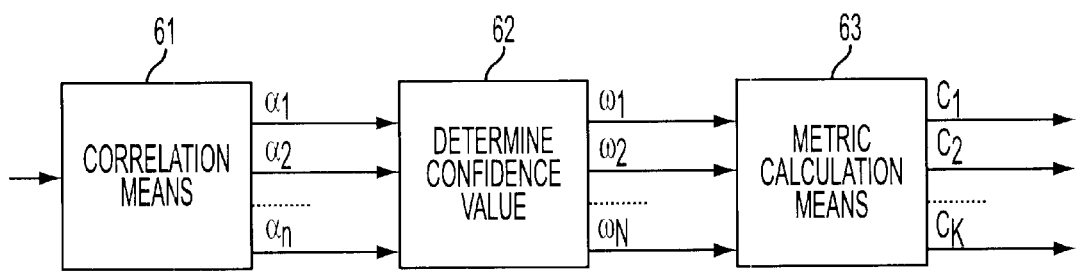
FIG. 2: A synoptic diagram of a demodulator for the implementation of a demodulation process according to the present invention.

A demodulator which makes use of a process of demodulation according to the invention consists essentially, as with the state of the prior art represented in FIG. 2, of correlation means 61 which receive the signals deriving from a receiver unit 50 and which deliver the correlation values $\alpha_1$ to $\alpha_n$ of these incoming signals with the n orthogonal functions (for example, the Walsh functions) $S_1$ to $S_n$ that could have been used during the modulation. These correlation values are transmitted to means 62, which deliver to metric calculation means 63 the confidence values $w_1$ to $w_N$, associated respectively with each sequence that could have been transmitted between $SE_1$ to $SE_N$. The confidence values $w_1$ to $w_N$ represent the portion of the energy associated with each sequence $SE_1$ to $SE_N$.

In order for a demodulator according to the invention to be able to function when the modulation on the transmitter side has been carried out by bi-orthogonal modulation, it differs from those which are known in the art essentially by the process which is carried out in the means 62 for the calculation of the energy portion $w_p$ associated with each sequence $SE_p$ that could have been transmitted. This process is now described.

A symbol p will be considered, which contains k elements $u_i$ with i varying from 1 to k. The sequence transmitted, corresponding to this symbol, is the sequence referred to as $SE_p$. If this symbol has been demodulated by bi-orthogonal modulation, two scenarios arise. In the first case, its last element ($k^{th}$ element), referred to as $u_k$, is in a first state (for example +1), and the sequence transmitted $SE_p$ corresponds to a Walsh function, referred to as $S_q$.

In the second case, its $k^{th}$ element is in a second state (for example −1), the sequence transmitted $SE_p$ corresponds to the logical complement $\overline{S_q}$ of the same Walsh function $S_q$.

In the first case, according to the invention, the confidence value or energy portion $w_p$ associated with the sequence $SE_p$ is either equal to the square of the correlation value $\alpha_p$ between the incoming signal and the Walsh function $S_q$ corresponding to this sequence $SE_p$, if this correlation value $\alpha_p$ is positive ($w_p=\alpha_p^2$), or, if the correlation value $\alpha_p$ is negative, equal to zero ($w_p=0$).

In the second case, the confidence value $w_p$ associated with the sequence is either equal to the square of the correlation value $\alpha_p$ between the incoming signal and the Walsh function $S_q$ corresponding to this sequence $SE_p$ if this correlation value $\alpha_p$ is negative ($w_p=\alpha_p^2$), or, if the correlation value $\alpha_p$ is positive, equal to zero ($w_p=0$).

For example, if we consider a bi-orthogonal modulation according to the Table II above, we will have two correlation values, $\alpha_1$ and $\alpha_2$ respectively. Table III below gives the values of the energy portions $w_1$ to $w_4$ corresponding to these two values $\alpha_1$ and $\alpha_2$ when they are positive.

TABLE III

| Incoming symbol | Energy portion |
| --- | --- |
| 1  1 | $w_1 = \alpha_1^2$ |
| −1  1 | $w_2 = \alpha_2^2$ |
| 1 −1 | $w_3 = 0$ |
| −1 −1 | $w_4 = 0$ |

As far as Table IV below is concerned, this gives the value of the energy portions $w_1$ to $w_4$ corresponding to these two values $\alpha_1$ and $\alpha_2$, the first being, by way of example, positive while the second is negative.

TABLE IV

| Incoming symbol | Energy portion |
| --- | --- |
| 1  1 | $w_1 = \alpha_1^2$ |
| −1  1 | $w_2 = 0$ |
| 1 −1 | $w_3 = 0$ |
| −1 −1 | $w_4 = \alpha_2^2$ |

According to another characteristic of the invention, the confidence value $w_p$ associated with the sequence $SE_p$ is calculated as described above, but weighted by a factor, referred to as m, which is a function of the whole of the correlation values $\alpha_1$ to $\alpha_n$. In an advantageous way, the value of the weighting factor m is given by the formula:

$$m = \frac{1}{\sqrt{\sum_{j=1}^{n} \alpha_j^2}}$$

The metric means 63 which are provided in order to supply $k=\log_2(N)$ soft decision values $C_1$ to $C_k$ associated with each element of the demodulated symbol, may be of the type described earlier. It should be recalled that the soft decision value $C_i$ associated with the element $u_i$ of the demodulated symbol is therefore given by the following formula:

$$C_i = \max_{p\_for\_which\_u_i=+1}(w_p) - \max_{p'\_for\_which\_u_i=-1}(w_{p'})$$

For example, in the case described in Table III above, and if the absolute value of $\alpha_1$ is greater than that of $\alpha_2$, we can derive:

$$C_1 = w_1 - 0 = w_1$$

and, $$C_2 = w_1 - w_2$$

Likewise, in the case described in Table IV above, and if the absolute value of $\alpha_1$ is greater than that of $\alpha_2$, we can have:

$$C_1 = w_1 - w_4 \, et,$$

$$C_2 = w_1 - w_4$$

Nevertheless, as it has already been mentioned above, this metric calculation does not take consideration of all the elements $u_i$ of the demodulated symbol because a choice has to be made.

So, in order to be able to take consideration of all the symbols, according to one embodiment of the invention the metric means 63 are such that the calculated decision value Ci associated with the $i^{th}$ element $u_i$ of the demodulated symbol is equal to the sum of the energy portions $w_i$ associated with the sequences which could have been transmitted, for which the said $i^{th}$ element $u_i$ of the corresponding symbol is equal to a first value (for example, +1), from which we take off the sum of the energy portions $w_i$ associated with the sequences that could have been transmitted, for which the said $i^{th}$ element $u_i$ of the corresponding symbol is equal to a second value (for example $-1$).

In mathematical terms, this definition can be written as:

$$C_i = \sum_{\text{For\_all\_}p\_\text{for\_which\_}u_i=+1}(w_p) - \sum_{\text{For\_all\_}p'\_\text{for\_which\_}u_i=-1}(w_{p'})$$

This metric calculation is now based on a weighted sum of the confidence values, rather than on a selection of the strongest values, For example, in the case described in Table III above, we would have:

$$C_1 = (w_1 + w_2) - 0$$

$$C_2 = w_1 - w_2$$

Likewise, in the case described in Table IV above, we would have:

$$C_1 = w_1 - w_2$$

$$C_2 = w_1 - w_2$$

It will be noted that, in the case of orthogonal modulation, means 63 such as those that have just been described could be used. The values of the energy portion $w_p$ would then be equal to $\alpha_p^2$, and we would therefore have, for each element $u_i$ of the demodulated symbol, the decision value $C_i$, which, as hitherto, would be written:

$$C_i = \sum_{\text{For\_all\_}p\_\text{for\_which\_}u_i=+1}(w_p) - \sum_{\text{For\_all\_}p'\_\text{for\_which\_}u_i=-1}(w_{p'})$$

What is claimed is:

1. A process for the demodulation of signals representative of sequences ($SE_1$ to $SE_N$) transmitted in a communications system, each transmitted sequence ($SE_1$ to $SE_N$) being the result of a bi-orthogonal modulation which associates to a symbol (p) either an orthogonal function ($S_1$ to $S_n$) if said symbol (p) has its last element ($u_k$) which is in a first state, or the logical complement of said orthogonal function ($S_1$ to $S_n$), if said symbol (p) has its last element ($u_k$) which is in a second state, said process being provided in order to determine each of a plurality of soft decision values ($C_1$ to $C_k$) to be attributed to each element of the demodulated symbol, with a view to subsequent decoding of a maximum probability type, characterised in that it comprises determining a correlation value ($a_1$ to $a_n$) between each orthogonal function ($S_1$ to $S_n$) that could have been used during the modulation process, and the signals to be demodulated;

deducting from said correlation values ($a_1$ to $a_n$) a confidence value ($w_1$ to $w_N$) attributed to each sequence ($SE_1$ to $SE_N$) that could have been transmitted, said confidence value ($w_1$ to $w_N$) being calculated in the following manner:

if the symbol (p) associated with said sequence ($SE_p$) has its last element ($U_k$) which is in a first state, said value ($w_p$) is either equal to the square of the correlation value ($a_q$) between signal to be demodulated and the function ($S_q$) used for said sequence ($SE_p$) if said correlation value ($a_q$) is positive, or zero if said correlation value ($a_q$) is negative;

if the symbol (p) associated with said sequence ($SE_p$) has its last element ($u_k$) which is in a second state, said value ($w_p$) is either zero if the correlation value ($a_q$) between the signal to be demodulated and the function ($S_q$) used for said sequence ($SE_p$) is positive, or equal to the square of the correlation value ($a_q$) if said correlation value ($a_q$) is positive;

deducting from said confidence values ($w_1$ to $w_N$) said soft decision values ($C_1$ to $C_k$) to be attributed to each element of the demodulated symbol.

2. A process according to claim 1, characterised in that the decision value ($C_1$) to be attributed to an element ($u_i$) of the demodulated symbol is calculated as being equal to the sum of all the confidence values attributed to the sequences ($SE_j$) associated with the symbol (p), of which said element ($u_i$) is equal to a first value, the sum from which is deducted from the sum of all the confidence values ($w_j$) associated with the sequences ($SE_j$) corresponding to the symbols (p') of which said element ($u_i$) is equal to a second value.

3. A process according to claim 2, characterised in that it comprises multiplying, prior to the calculation of the decision values, each confidence value ($w_1$ to $w_N$) by a weighting factor (m) which is a function of the correlation values ($a_1$ to $a_n$).

4. A process according to claim 3, characterised in that the value of the weighting factor is given by the formula:

$$m = \frac{1}{\sqrt{\sum_{j=1}^{n} a_j^2}}$$

where $\alpha_j$ represents the correlation value associated with the orthogonal function $S_j$.

* * * * *

UNITED STATES PATENT AND TRADEMARK OFFICE
CERTIFICATE OF CORRECTION

PATENT NO. : 6,434,111 B1
DATED : August 13, 2002
INVENTOR(S) : Voyer et al.

It is certified that error appears in the above-identified patent and that said Letters Patent is hereby corrected as shown below:

Column 8,
Lines 53 through 62, please correct the formula in claim 4 as follows:
4. A process according to Claim 3, characterised in that the value of the weighting factor is given by the formula:

$$m = 1 \bigg/ \sqrt{\sum_{j=1}^{n} \alpha_j^2}$$

where $\alpha_j$ represents the correlation value associated with the orthogonal function $S_j$.

Signed and Sealed this

Twenty-sixth Day of August, 2003

JAMES E. ROGAN
*Director of the United States Patent and Trademark Office*